United States Patent [19]

Minderman et al.

[11] Patent Number: 5,340,351
[45] Date of Patent: Aug. 23, 1994

[54] POULTRY CONVEYOR LINE TRANSFER SYSTEM

[75] Inventors: Walter Minderman, Rotterdam; Arend Hobbel, Numansdorp, both of Netherlands

[73] Assignee: Systemate Holland B.V., Numansdorp, Netherlands

[21] Appl. No.: 6,389

[22] Filed: Jan. 21, 1993

[51] Int. Cl.$^5$ .............................................. A22C 21/00
[52] U.S. Cl. ..................................... 452/182; 452/183
[58] Field of Search ............... 452/182, 183, 177, 179, 452/180

[56] References Cited

U.S. PATENT DOCUMENTS

| | | | |
|---|---|---|---|
| 4,570,295 | 2/1986 | Van Mil | 452/182 |
| 4,791,704 | 12/1988 | Chapman | 452/182 |
| 4,813,101 | 3/1989 | Brakels et al. | 17/11 |

FOREIGN PATENT DOCUMENTS 225306  6/1987  European Pat. Off. ............ 452/182

Primary Examiner—Willis Little
Attorney, Agent, or Firm—Hopkins & Thomas

[57] ABSTRACT

A bird transfer carrousel is provided for transferring birds between two conveyor lines wherein the shackles of one conveyor line are spaced at a different increment than the shackles of the other conveyor line. The bird transfer carrousel comprises a rotatable, cylindrical turret (22) positioned between the two conveyor lines. The turret carries a series of parallel travel bars (26) that are arranged angularly displaced around the turret and are adapted to reciprocate or slide within the turret. Bird transfer plates (32) are mounted at each end of the parallel travel bars (26). The bird transfer plates (32) are horizontally arranged in a common plane, and each comprises a pair of outwardly exposed recesses for receiving and carrying the birds from the first conveyor line (12) to the second conveyor line (14). A cam system (30,38) reciprocates the travel bars toward and away from their axis of rotation, which moves the bird transfer plates (32) closer together and further apart to match the spacing of the two conveyor lines.

14 Claims, 6 Drawing Sheets

POULTRY CONVEYOR LINE TRANSFER SYSTEM

FIELD OF THE INVENTION

This invention relates in general to poultry conveying equipment for moving birds along a poultry processing line through a poultry processing facility. More particularly, the invention comprises a method and apparatus for transferring poultry or like birds from one suspended conveyor system to another suspended conveyor system of the poultry processing line as the birds are moved through the poultry processing facility.

BACKGROUND OF THE INVENTION

During the processing of poultry, such as chickens, turkeys, ducks, and other similar types of birds, through a poultry processing facility, multiple conveyor lines are often utilized to carry the birds through a series of work stations wherein the birds are defeathered, decapitated, eviscerated, and cut-up for packaging and shipment to market.

The multiple conveyor lines and their associated work stations perform an array of automated operations on the birds that are designed to process the birds in a quick, efficient, and uniform manner. In addition, such automated processing operations reduce safety risks to operating personnel and lower overall labor costs.

To minimize labor costs as well as to process the birds quickly and efficiently, it is desirable to perform as many of the cut-up and processing operations as possible with automated processing equipment with a minimum of manual handling of the birds. However, because the different conveyor lines of different processing lines are often configured differently according to the operations performed by the processing lines, it is sometimes difficult to transfer the birds efficiently between conveyor lines. For example, some conveyor lines, such as the cooling line, space their shackles six inches apart as the birds are carried by the conveyor, while other conveyor lines, such as the cut-up line, space their shackles twelve inches apart. This disparity often creates problems in the process of automatically transferring the birds from one conveyor to next.

In the past, the transfer of birds from one conveyor line to another was primarily manually performed by operators unloading the birds from the shackles of one line and reloading them on the shackles of another line. Such a manual method of rehanging birds is slow, inefficient, and labor intensive.

More recently, automated machinery has been developed for transferring birds between conveyor lines. An example of such an apparatus is disclosed in U.S. Pat. No. 4,813,101 of Brakels et al. However, such an apparatus does not appear to be able to transfer birds between conveyor lines having different spacing between shackles.

Accordingly, a need exists for an improved method and apparatus for automatically transferring birds from one suspended conveyor line to another suspended conveyor line within a processing facility.

SUMMARY OF THE INVENTION

Briefly described, the present invention comprises a method and apparatus for automatically transferring birds from one suspended conveyor line to another suspended conveyor line wherein the spacing of the shackles of the two conveyor lines is different.

The first conveyor line includes a series of shackles moved therealong in spaced series, with the shackles spaced at a predetermined distance, such as six inches. The second conveyor line includes a plurality of shackles moved therealong in series, with the shackles spaced a substantially larger predetermined distance, such as twelve inches.

The two conveyor lines are generally aligned parallel with one another, with the shackles of each line moving in opposite directions. The poultry conveyor line transfer system is positioned between the first and second conveyor lines.

The poultry conveyor line transfer system comprises a support module, or turret, that is rotatably mounted between the first and second conveyor lines. The turret is a vertically oriented cylindrical drum having an array pairs of horizontally spaced openings formed about its periphery each radially aligned with a pair of horizontally spaced openings on an opposite side of the cylindrical drum. Pairs of linked parallel travel bars are radially aligned and slidably mounted within the corresponding pairs of aligned openings and are rotated with the rotation the turret. The pairs of parallel travel bars are angularly displaced within the turret to form a spoke ana wheel-like structure with the travel bars extending laterally through the turret and outwardly from opposed sides thereof. The pairs of parallel travel bars are also vertically spaced from each other within the turret so as to allow the bars to extend through the axis of rotation the turret without contacting each other at the center the turret.

A bird transfer plate is horizontally mounted at each end of the pairs of parallel travel bars. Each bird transfer plate has a pair a spaced recesses along its outer edge for receiving and carrying the legs of the birds. The spacing between the recesses is approximately equivalent to the spacing of the legs of the birds as they are carried by the shackles of the conveyor lines.

The turret is rotated in timed relationship with the first and second conveyors so that as the turret rotates, the bird transfer plates move along an elliptical path and into registration with the shackles of the first and second conveyor lines. The bird transfer plates are aligned in a common horizontal plane so that as they move into registration with the shackles of the conveyor lines, the legs of the birds can be urged into or out of the shackles and the recesses of the transfer plates.

The elliptical, or eccentric, path of the bird transfer plates is achieved by a cam system. A cam follower is rotatably mounted at the top of each end of the pairs of travel bars. A cam track is fixedly mounted above the turret to engage the cam followers as the turret is rotated. As the turret is rotated, the cam followers engage the cam track, which causes the travel bars to slide through their aligned openings in the turret in a reciprocating motion toward and away from the axis of rotation of the turret.

The reciprocal movement of the travel bars causes the bird transfer plates to move closer to and further away from the next adjacent bird transfer plate. As the bird transfer plates move closer together and further apart, the spacing between the plates changes to match the spacing of the shackles on the conveyor lines.

For example, as the bird transfer plates move around toward the first conveyor line, wherein the shackles are spaced six inches apart, the cam system reciprocates the travel bars, which moves the bird transfer plates closer to the turret and its axis of rotation. This causes the bird transfer plates to converge to the point that they are spaced six inches apart.

At the same time, the bird transfer plates mounted at the opposite ends of the travel bars are being moved further away from the turret and its axis of rotation. This causes these transfer plates to diverge to a spacing of twelve inches. As a result, all of the bird transfer plates travel in an eccentric path with respect to the axis of rotation of the turret.

Transfer cams are positioned at the intersections of the eccentric path of travel of the bird transfer plates and the two conveyor lines. When the recesses of the bird transfer plates are registered or aligned with the shackles carried by the conveyor lines, the legs of the birds engage the surfaces of the transfer cams and are urged between the shackles and the transfer plates.

Accordingly, it is an object of the present invention to provide an improved method and apparatus for transferring birds between conveyor lines having different shackle spacing.

Another object of the present invention is to provide a method and apparatus for quickly and efficiently removing birds from the shackles of a first conveyor line and rehanging the birds on the shackles of a second conveyor line.

Another object of the present invention is to provide a method and apparatus for transferring birds between conveyor lines that is simple in design, efficient in operation, and durable in structure.

These and other objects, features, and advantages of the present invention will become apparent from the following specification, when read in conjunction with the accompanying drawings.

DETAILED DESCRIPTION

Figure 1:
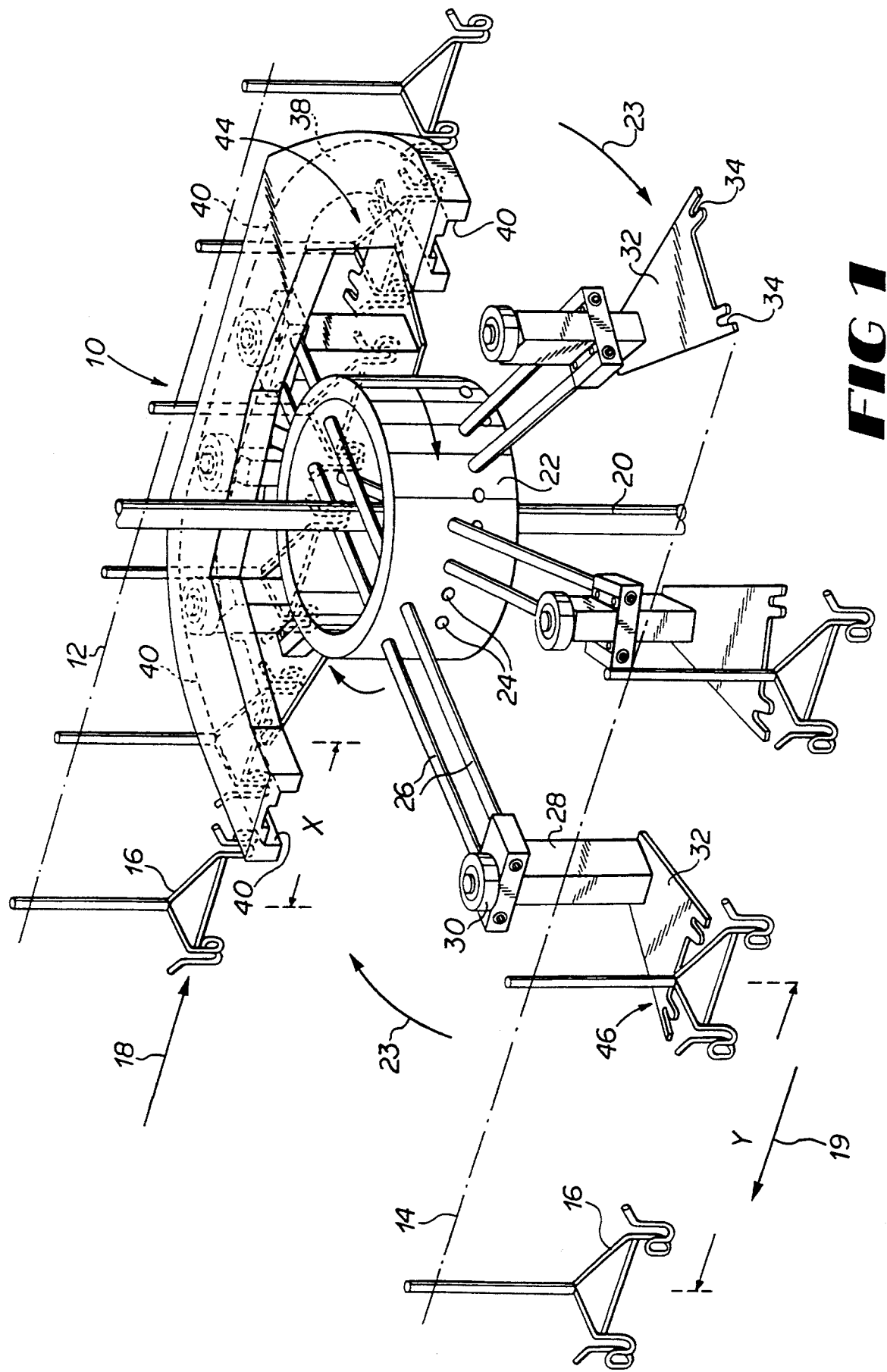
FIG. 1 is a perspective view of the bird transfer apparatus of the present invention constructed in accordance with a preferred embodiment thereof positioned between two conveyor lines and with parts of the apparatus removed for clarity.

Referring now in more detail to the drawings, in which like numerals represent like parts throughout the several views, FIG. 1 is a perspective view of the bird transfer apparatus or transfer carrousel 10 constructed in accordance with a preferred embodiment thereof. In FIG. 1, parts of the bird transfer carrousel 10 are not shown for clarity. The bird transfer carrousel 10 is positioned between a first conveyor line 12 and a second conveyor line 14. A series of equally spaced shackles 16 are suspended from the two conveyor lines 12,14.

The shackles 16 of the first conveyor line 12 are spaced six inches from one another, as indicated by the distance X, and the shackles 16 of the second conveyor line 14 are spaced twelve inches from one another, as indicated by distance Y. However, the present invention can be utilized to transfer birds between conveyor lines having different spacing, such as eight, nine, or ten inch spacing, with the principles and features of the present invention being equally adaptable to such arrangements. The two conveyor lines 12,14 are aligned substantially parallel with each other and are adapted to move their shackles 16 in opposite directions, as indicated by arrows 18 and 19.

The bird transfer carrousel 10 comprises a vertical drive shaft 20 that is rotatably secured to a rectangular frame structure, not shown. Preferably, the power for rotating the vertical drive shaft 20 is taken off of one of the conveyor line drive systems.

A vertically oriented, cylindrical support module or turret 22 is fixedly secured to the drive shaft 20 via top and bottom plates that enclose the cylinder, but for clarity are not shown. The vertical drive shaft is adapted to rotate the turret 22 in the direction indicated by arrows 23. The turret 22 includes an array of pairs of openings 24 that are formed about the periphery of the turret 22. Each pair of openings 24 is radially aligned with a pair of openings on an opposite side of the turret 22. The openings are arranged in a particular pattern as shall be discussed later.

Pairs of parallel travel bars 26 are slidably disposed within the corresponding aligned pairs of openings 24. Each pair of travel bars 26 extends outwardly through the cylindrical wall of the turret 22 and straddles the vertical drive shaft 20 at the center of the turret 22. The pairs of travel bars 26 are vertically spaced from each other along the height of the turret 22 in order to allow the travel bars to straddle the drive shaft without contacting each other. In addition, the pairs of travel bars 26 are angularly displaced from each other on equal angular radians around the turret.

A short, vertical beam 28 is mounted between the travel bars 26 at the ends of each pair of travel bars 26. The vertical beams 28 rigidly secure the travel bars 26 in spaced, parallel alignment. A cam roller or follower 30 is rotatably mounted on top of each vertical beam 28. A bird transfer plate 32 is mounted horizontally to the bottom of each vertical beam 28. Each pair of travel bars 26, the vertical beams 28 at each end of the travel bars, and the cam rollers 30 and bird transfer plates 32 mounted to each vertical beam form an integral assembly that shall be referred to as the transfer assembly. In FIG. 1, only three transfer assemblies are shown. However, the transfer carrousel 10 includes a plurality of transfer assemblies, the number of assemblies being dependent upon the particular requirements of a particular application.

Each bird transfer plate 32 includes a pair of spaced recesses 34 for receiving the legs of a bird. The recesses 34 of the bird transfer plates 32 are spaced from each other the same distance at which the shackles 16 support the legs of the birds. The bird transfer plates 32 function as a transfer means for supporting the legs of the birds and carrying the birds from the first conveyor 12 to the second conveyor 14.

A stationary cam track 38 is positioned about the side of the turret 22 adjacent the first conveyor line 12. The stationary cam track 38 is fixedly secured to the frame structure. The underside of the stationary cam track 38 forms a downwardly facing U-shaped groove 40 that is adapted to receive closely the cam follower 30 mounted on top of the vertical beams 28. The stationary cam track 38 is discussed in more detail with reference to FIG. 8.

The purpose of the cam rollers 30 and the stationary cam track 38 is to reciprocate the travel bars 26, and in turn the bird transfer plates 32, toward and away from the vertical drive shaft 20, the axis of rotation of the turret 22. This reciprocating movement moves the bird transfer plates closer to and further away from the turret as the bird transfer plates revolve about the transfer carrousel 10, which in turn causes the bird transfer plates to converge and diverge toward and away from adjacent plates. As the bird transfer plates 32 converge and diverge with respect to each other, the spacing between the bird transfer plates decreases and increases, respectively.

At the intersection 44 of the transfer carrousel 10 and the first conveyor line 12, the bird transfer plates 32 converge toward each other until the spacing between the plates becomes six inches to match the spacing between the shackles 16 of the first conveyor line 12. At the intersection 46 of the transfer carrousel 10 and the second conveyor line 14, the bird transfer plates diverge until the spacing therebetween becomes twelve inches to match the spacing between the shackles 16 of the second conveyor line 14.

Figure 2:
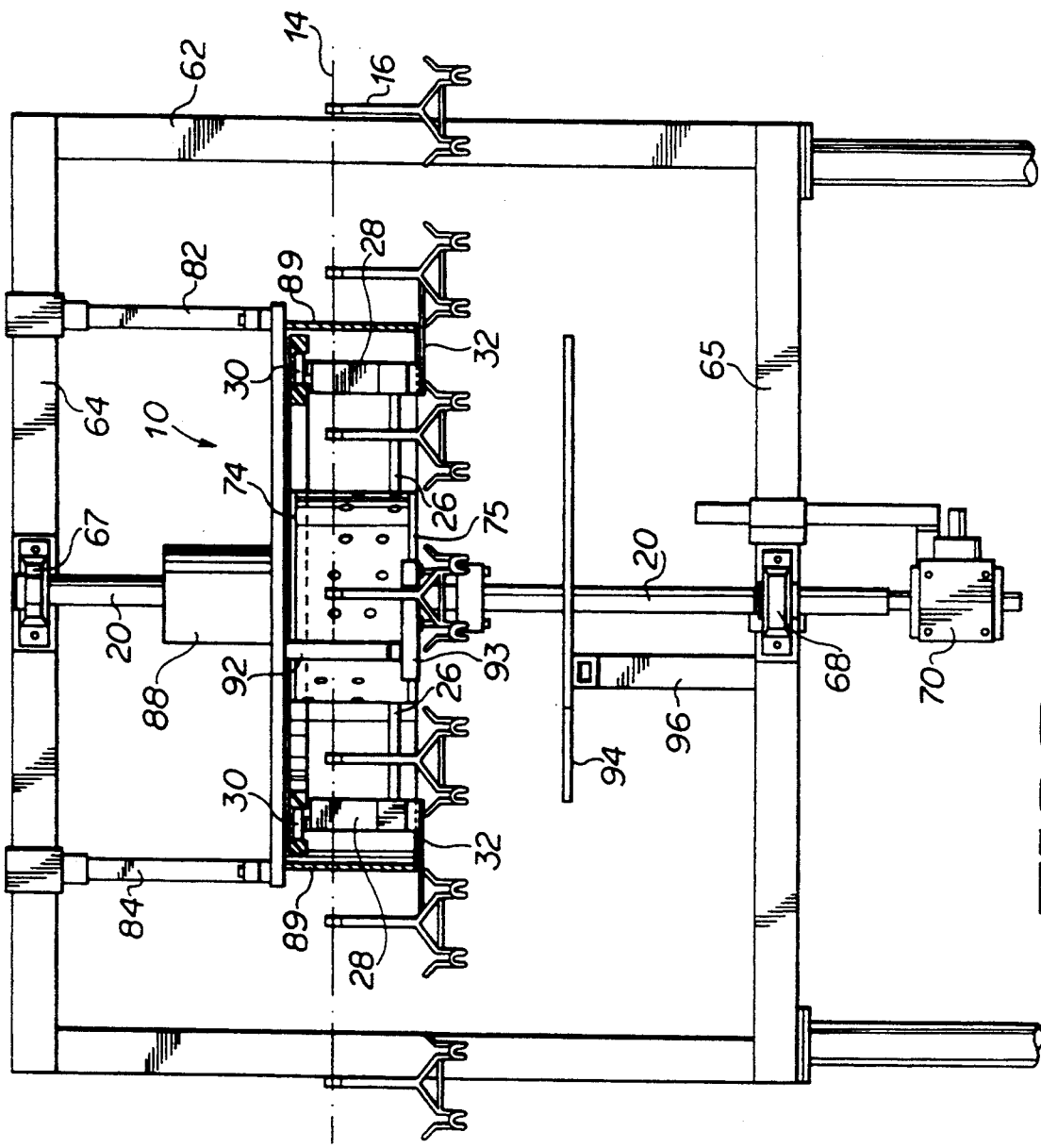
FIG. 2 is a front elevation view of the bird transfer apparatus of FIG. 1.

FIG. 2 is a front view of the bird transfer carrousel 10 of FIG. 1 as seen from the second conveyor line 14. The bird transfer carrousel 10 is mounted on a rectangular frame structure 62 comprising cross-members and upright beams well known in the art of sufficient strength and durability to support the components discussed herein. The vertical drive shaft 20 is rotatably secured to horizontal cross members 64 and 65 by bearings 67 and 68. A gear box 70 transmits power to the vertical drive shaft 20 from a source, not shown. Preferably, the source of power is taken off of the drive system of one of the conveyor lines.

The turret 22 includes a top plate 74 and a bottom plate 75 that close off the cylindrical wall of the turret 22. The turret 22 is fixedly secured to the vertical drive shaft 20 by the top and bottom plates 74,75.

A pair of downwardly projecting support arms 82 and 84 are mounted to the upper cross member 64 of the support frame 62. A fixed cylindrical disk 86 is mounted to the lower ends of support arms 82,84. A bearing 88 is secured to the cylindrical disk 86 and around the vertical drive shaft 20. The cam track 38 is mounted to the underside of the cylindrical disk 86 and extends around behind the turret 22, as shown in FIG. 2.

A circular shroud or skirt 89 depends from the perimeter of the cylindrical disk 86 for partially enclosing the turret 22 and the transfer assemblies 26, 28, 30, 32. The circular skirt 89 is shown cut-away in FIG. 2 to expose the foregoing components.

Shown in FIG. 2 is one transfer assembly, which includes a travel bar 26, a vertical beam 28 at each end of the travel bar 26, a cam roller 30 on top of each vertical beam 28, and a bird transfer plate 32. The bird transfer plates 32 extend laterally outwardly of the circular shroud 89 and, thus, are not entirely concealed by the shroud. A bracket 92 is mounted at the edge of the cylindrical disk 86 and extends downwardly to the shackles 16. A cam transfer bar 93 is horizontally mounted to the bottom of the bracket 92 at the level of the plane of travel of the bird transfer plates 32. The cam transfer bar 93 is positioned to engage the legs of the birds as the recesses of the bird transfer plates 32 align with the shackles 16 of the conveyor line 14. When the shackles and the bird transfer plates are aligned, the cam transfer bar urges the legs from the recesses of the bird transfer plates and into the shackles. A similar cam transfer bar, not shown, is positioned at the intersection 44 the first conveyor line 12 and the transfer carrousel 10 to transfer the birds from the shackles of the first conveyor line to the bird transfer plates.

A horizontal, elongated guide bar 94 is mounted to an upright support beam 96 that is secured to the frame 62. The elongated guide bar 94 is positioned adjacent the path of travel of the birds as they are transferred by the transfer carrousel 10. The guide bar 94 stabilizes the bodies of the birds prior to the transfer of the birds to the shackles of the second conveyor line 14.

Figure 3:
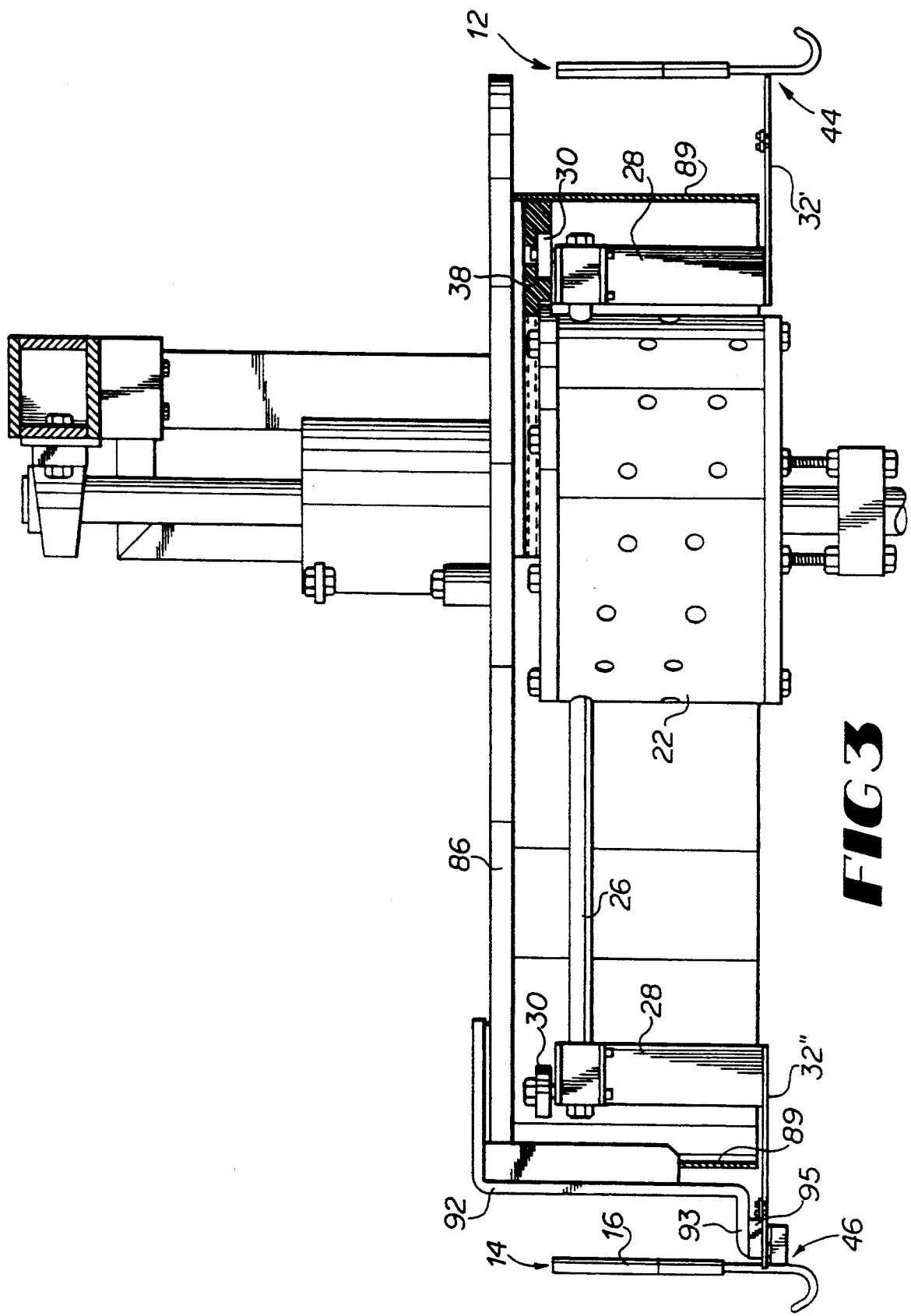
FIG. 3 is a side elevation view of the bird transfer apparatus of FIG. 1.

FIG. 3 is an enlarged side elevation view of the transfer carrousel 10. Again, a single transfer assembly 26, 28, 30, and 32 is illustrated for clarity. In FIG. 3, the bird transfer plates 32 illustrated are aligned at the intersections 44,46 between the transfer carrousel 10 and the conveyor lines 12,14.

The circular skirt 89, which depends from the circular disk 86, extends downwardly into close proximity with the bird transfer plates 32. However, the circular skirt 89 is again shown cut away to expose the interior components of the transfer carrousel 10.

The cam transfer bar 93 includes an angled surface 95 for progressively urging the legs of the birds from the bird transfer plate 32 into the shackles 16 of the second conveyor line 14. FIG. 3 shows the mounting of the bracket 92, which supports the cam transfer bar 93, to the circular disk 86.

At the point of the revolution of the travel bars 26 around the turret 22, as shown in FIG. 3, the bird transfer plate 32' adjacent the first conveyor line 12 is reciprocated by the cam track 38 toward the turret 22 to its closest position to the turret 22. The bird transfer plate 32" adjacent the second conveyor line 14 is reciprocated away from the turret 22 to its farthest distance from the turret 22. In this position, both bird transfer plates 32 are aligned with the shackles 16 of each conveyor line 12,14.

At the intersection 46 of the second conveyor line 14 and the transfer carrousel 10, the cam transfer bar 93 engages the legs of the bird carried by the transfer plate 32" adjacent the second conveyor line 14 and urges the bird from the recesses of the transfer plate 32 into the shackles 16.

At the intersection 44 of the first conveyor line 12 and the transfer carrousel 10, another cam transfer device, not shown, is positioned for transferring the birds from the shackles 16 of the first conveyor line 12 into the bird transfer plates 32 of the transfer carrousel 10.

As stated previously, only one transfer assembly is shown in FIG. 3. The travel bars 26 of this assembly are mounted to the upper ends of the vertical beams 28. The other travel bars that are not shown are slidably received within the turret 22 at different locations vertically spaced from each other. For example, the travel bars 26 shown in FIG. 2 are the lower most travel bars on the turret 22. Consequently, these travel bars 26 are mounted to their respective vertical beams 28 at the lower ends of the beams. As a result, both of the vertical beams shown in FIGS. 2 and 3 are positioned at the same height, and therefore, the cam rollers 30 and bird transfer plates 32 mounted to these vertical beams are positioned at the same height. The remaining travel bars, not illustrated, are mounted to their respective vertical beams at positions along the heights of the beams.

Figure 4:
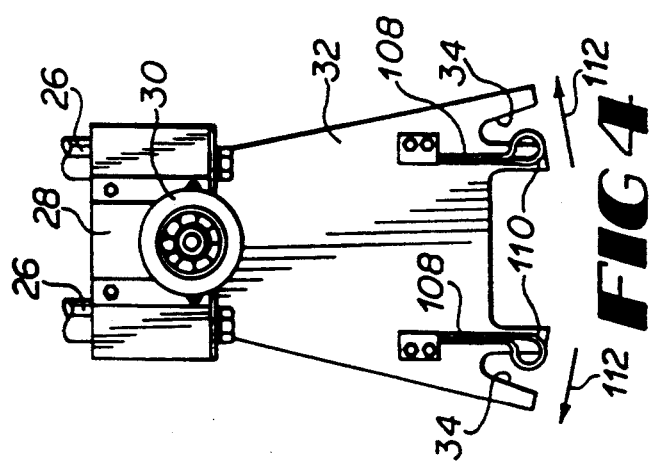
FIG. 4 is an enlarged plan view of the bird transfer plate of the apparatus of FIG. 1.

FIG. 4 is an enlarged plan view of the bird transfer plate 32 and one end of a transfer assembly, including the parallel travel bars 26, the cam roller 30, and the vertical beam 28. The pair of recesses 34 at the outer edge of the bird transfer plate 32 are U-shaped for receiving the legs of the bird. A spring pin 108 is mounted on the top side of the bird transfer plate 32 adjacent each recess 34. Each spring pin 108 has a loop 110 at its outer flexible end that extends partially over the recesses 34. The loops 110 of each spring pin 108 flex, as indicated by arrows 112. As the legs of a bird are pushed into or out of the recesses 34, the loops 110 flex toward each other to allow the legs of the bird to move past the loops. When the birds are carried by the bird transfer plates 32, the loops 110 hold the legs within the recesses 34.

Figure 5:
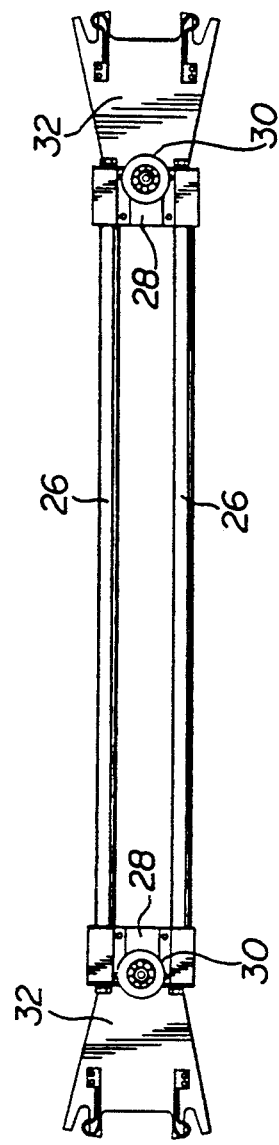
FIG. 5 is an enlarged plan view of the parallel travel bars of the apparatus of FIG. 1.

FIG. 5 is a plan view of a transfer assembly, including a pair of parallel travel bars 26, a vertical beam 28 at each end of the travel bars, a cam roller 30 mounted on top of each vertical beam, and a bird transfer plate 32 extending outwardly from the vertical beams. The transfer assembly is an integral unit that reciprocates through the turret in response to the engagement of the cam roller 30 with the cam track.

Figure 7:
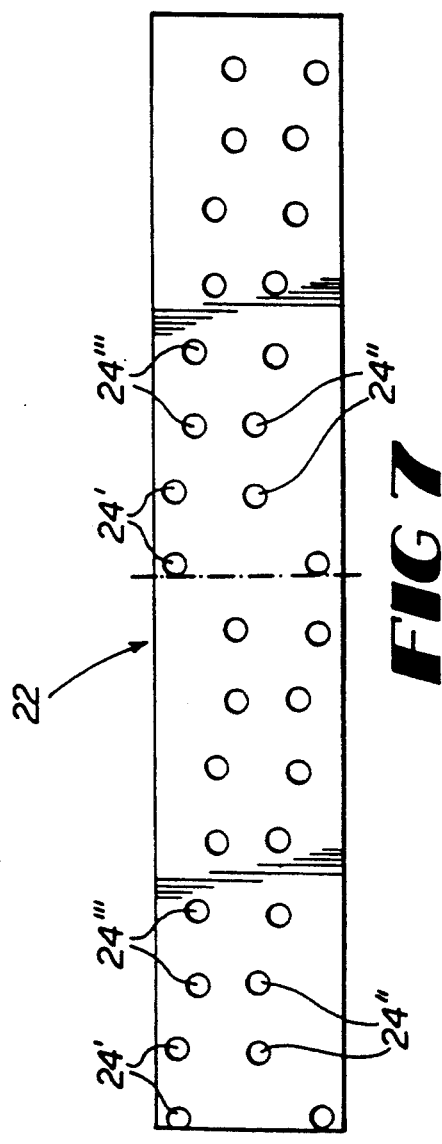
FIG. 7 is a schematic view showing the hole pattern for the array of openings in the turret of FIG. 1.
Figure 6:
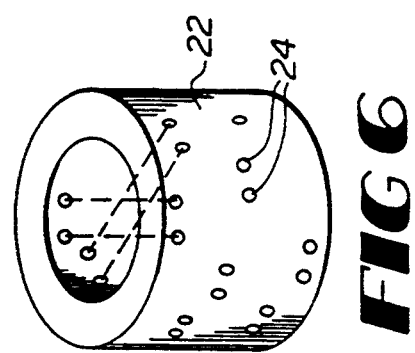
FIG. 6 is an enlarged perspective view of the turret of the apparatus of FIG. 1.

FIG. 6 is a perspective view of the turret 22 with the top plate and the bottom plate of the turret removed. FIG. 7 is a schematic drawing of the hole pattern for the array of openings 24 in the cylindrical wall of the turret 22. Shown in FIG. 7, each corresponding set of aligned openings 24 comprise a pair of openings in one half of the cylindrical wall of the turret and one pair of openings in the opposite half of the cylindrical wall, the halves of the cylindrical wall being denoted by dashed line 112.

As shown in FIGS. 6,7, the array of openings 24 are arranged in a particular pattern. The highest set of openings 24' are positioned adjacent the top of the turret 22. The next pair of openings 24" are positioned on the lower portion of the turret and partially overlap laterally the openings 24' near the top of the turret. The next pair of openings 24''' are incrementally spaced below the first pair of openings 24' in the upper portion of the turret. The openings 24 alternate in this fashion to create an array of openings sufficient to receive eight pairs of parallel travel bars with every other travel bar position incrementally below one another.

Figure 8:
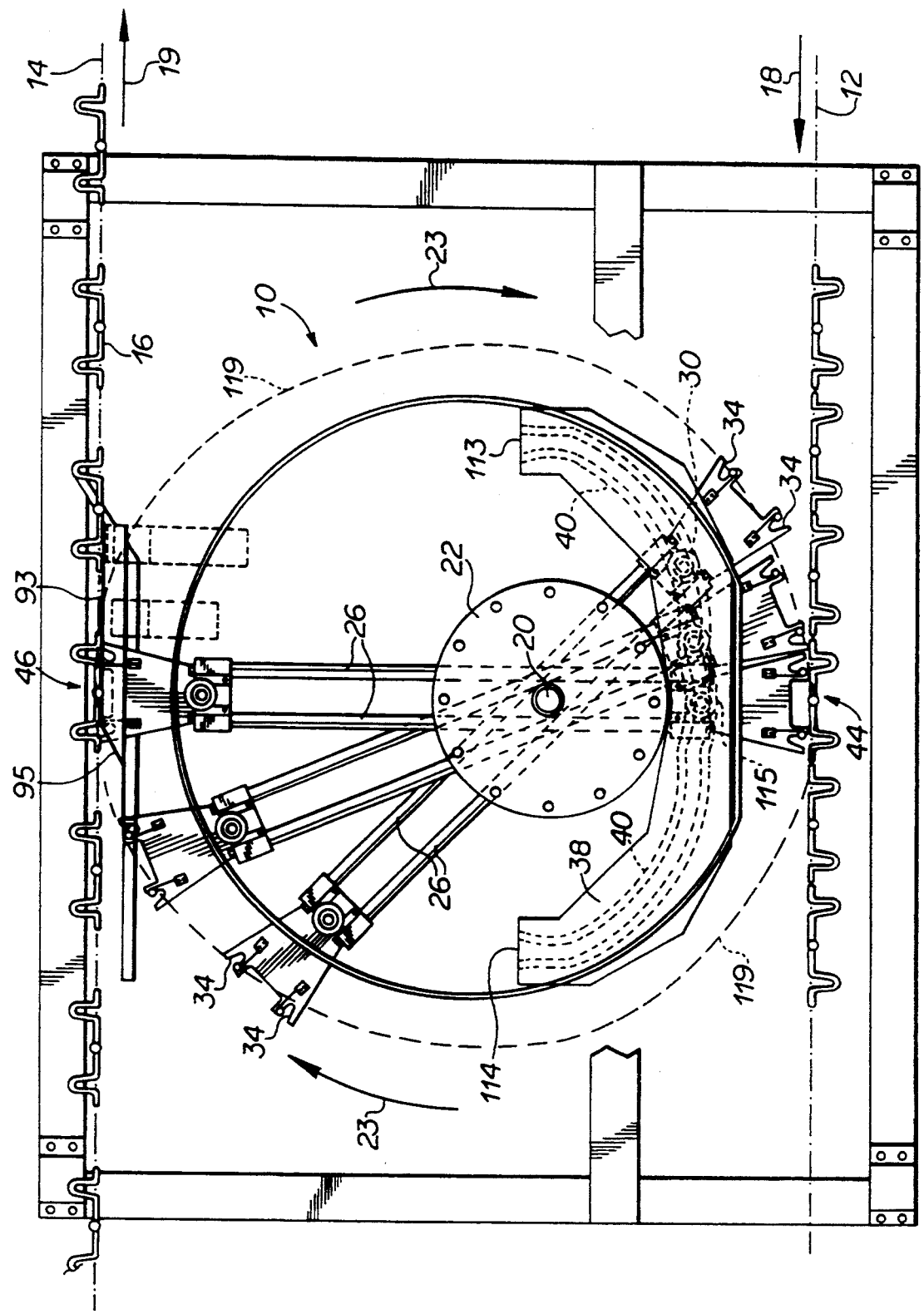
FIG. 8 is a plan view of the bird transfer apparatus of FIG. 1 shown with certain parts removed for clarity.

FIG. 8 is a top view of the transfer carrousel 10 with the circular disk removed for clarity. In this view, three transfer assemblies are illustrated. As can be seen, each pair of travel bars 26 straddles the vertical drive shaft 20 at the center of the turret 22. Each pair of travel bars 26 is displaced angularly on equal angular radians about the vertical drive shaft 20. Thus, each pair of travel bars 26 is angularly spaced an equal angle from its adjacent pair of travel bars.

The stationary cam track 38 is positioned 180 degrees around the turret 22 on the first conveyor line side of the turret. The U-shaped groove 40, shown in dotted lines, forms a symmetrical pattern about a plane extending perpendicularly between the two conveyor lines 12,14 and through the vertical drive shaft 20. The cam track 38 is positioned farthest from the turret 22 at its beginning 113 and ending 114 portions. At its center portion, which is adjacent the intersection 44 of the transfer carrousel 10 and the first conveyor line 12, the cam track 38 is at its closest position to the turret 22. Thus, from its beginning and ending portions and around toward its center portion, the cam track 38 converges toward the turret 22. However, at its center portion, the cam track 38 stops converging toward the turret 22 and forms an arcuate portion 115 that is concentric with the turret 22. This arrangement causes the bird transfer plates 32 to stop reciprocating toward or away from the turret 22 for a short length of travel.

FIG. 8 shows the cam transfer bar 93 positioned at the intersection 46 of the transfer carrousel 10 and the second conveyor line 14. The cam transfer bar 93 has an angled surface 95 for engaging the legs of the birds and transferring the birds from the transfer plates 32 to the shackles 16 of the second conveyor line 14.

As shown in FIG. 8, the transfer carrousel 10 revolves in the direction of arrows 23, while the first conveyor line 12 moves in the direction of arrow 18 and the second conveyor line moves in the direction of arrow 19. In response to the rotation of the transfer carrousel 10, the cam rollers 30 engage the cam track 38 and cause the travel bars 26 to reciprocate toward and away from the vertical drive shaft 20, which functions as the axis of rotation for the travel bars 26.

The reciprocation of the travel bars as they revolve around the transfer carrousel 10 causes the recesses 34 of the bird transfer plates 32 to move in an eccentric path, as indicated by dashed line 119, with respect to the axis of rotation of the travel bars 26. As the bird transfer plates 32 move on the eccentric path 119, they converge toward each other as they near the intersection 44 of the eccentric path 119 and the first conveyor line 12, and they diverge from each other as they near the intersection 46 of the eccentric path 119 and the second conveyor line 14.

The relative movement of the bird transfer plates 32 causes the spacing between the plates to decrease to six inches at the first conveyor line 12 and to increase to twelve inches at the second conveyor line 14. However, it should be noted that any desired spacing between the bird transfer plates 32 can be achieved through selection of the necessary number of pairs of travel rods and the proper angular displacement of the pairs of travel rods from each other. In addition, a desired spacing can also be achieved by varying the extent that the cam track converges toward the turret, and thus, the extent that the bird transfer plates reciprocate toward their axis of rotation.

Figure 9:
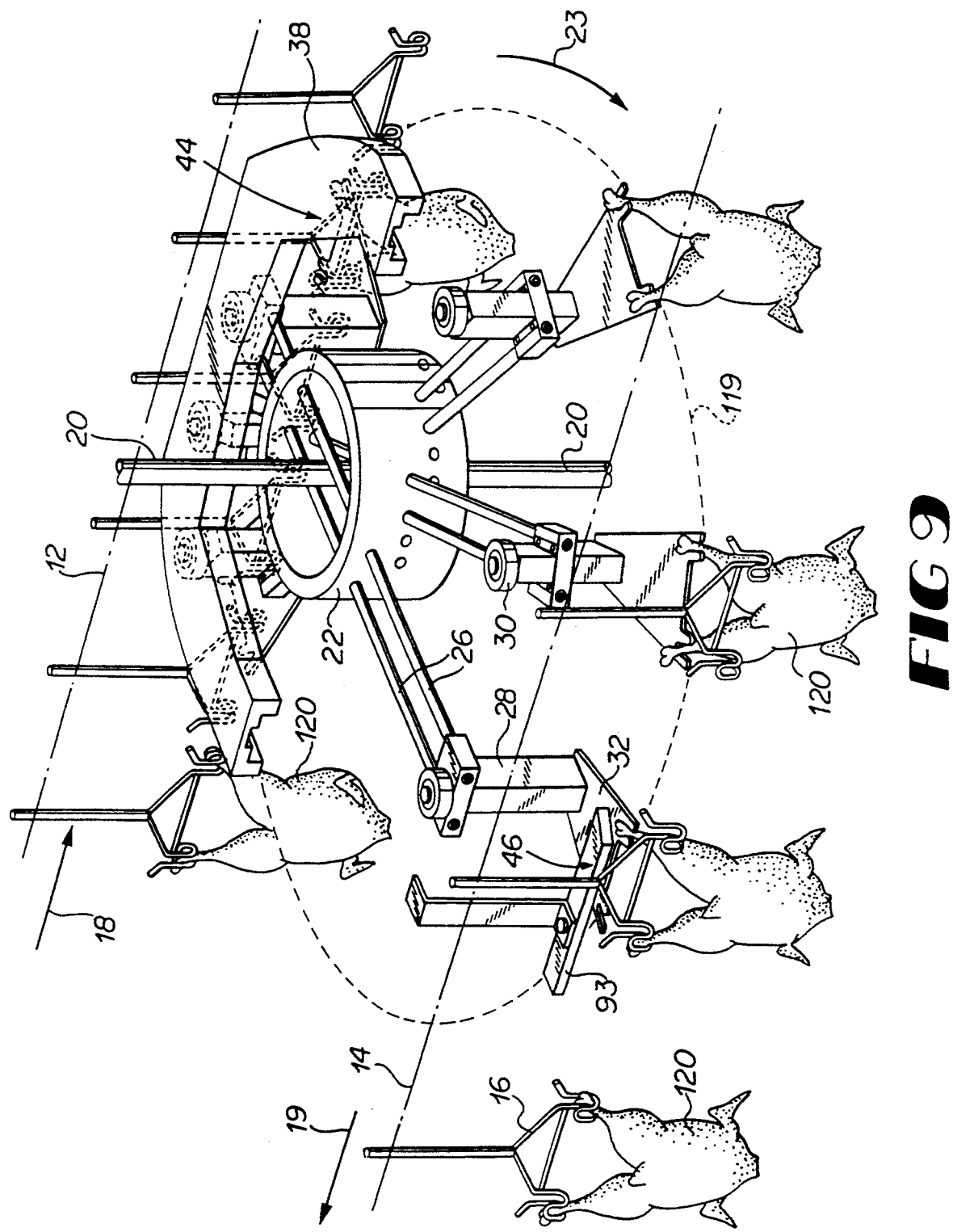
FIG. 9 is the perspective view of FIG. 1 shown with birds carried by the shackles and transferred by the apparatus of the present invention.

FIG. 9 is the perspective of FIG. 1 shown with birds 120 added to the conveyor lines 12,14 and to the transfer carrousel 10. Also, the bracket 92 and the cam transfer bar 93 have been added to show their relative position to the intersection 46 of the transfer carrousel 10 and the second conveyor line 14.

In operation, the birds 120 move in the direction of arrow 18 along the first conveyor line 12 toward the transfer carrousel 10. At the intersection 44 of the transfer carrousel 10 and the first conveyor line 12, the bird transfer plates 32 are moved into registration with the shackles 16 of the first conveyor line 12. The birds 120 are then urged by a cam mechanism (not shown) into the bird transfer plates 32 carried by the turret and transfer assembly. Thus, it can be seen that the turret and transfer assembly function as a means for moving the bird transfer plates into registration with the shackles of the first conveyor line.

While carried by the transfer carrousel 10, the birds 120 move in the direction of arrow 23 around toward the second conveyor line 14. As the transfer carrousel 10 revolves, the cam system 30, 38 reciprocates the travel bars 26 through the turret 22, which cause the bird transfer plates 32 that are carrying the birds 120 to be moved further from the turret 22. As the bird transfer plates 32 move further from the turret 22, the spacing between the bird transfer plates increases. Thus, it can be seen that the cam system functions as a means for moving the bird transfer plates along an eccentric path 119 about the vertical drive shaft 20.

At the intersection 46 between the transfer carrousel 10 and the second conveyor line 14, the bird transfer plates 32 are moved into registration with the shackles 16 of the second conveyor line 14. The legs of the birds then engage the cam transfer bar 93 and are urged into the shackles 16 of the second conveyor line 14. Thus, it can be seen that the cam transfer bar 93 functions as a means for moving the birds from the bird transfer plates to the shackles of the second conveyor line.

The birds 120 are then carried by the shackles of the second conveyor line 14 in the direction of arrow 19.

The features and principles of the present invention have been illustrated in the foregoing description of a preferred embodiment thereof. It will be apparent to those skilled in the art that numerous changes or modifications may be made thereto without departure from the spirit and scope of the invention.

What we claim is:

1. A method of transferring birds from a first conveyor line on which the birds are suspended by their legs on a series of shackles substantially equally spaced at a first predetermined distance to a second suspended conveyor line having a series of shackles substantially equally spaced at a second predetermined distance that is different than the first predetermined distance, comprising the steps of:

revolving a series of transfer means, each having spaced leg receiving recesses formed therein, along a processing path adjacent the first and second conveyor lines and as the transfer means revolve, moving the leg receiving recesses of the transfer means into registration with the legs of the birds suspended from the shackles of the first conveyor line, as the transfer means revolve along their processing path, moving the transfer means closer together to register with the shackles that are close together on one conveyor line and moving the transfer means further apart to register with the shackles that are further apart on the other conveyor line, and as the transfer means register with the shackles, transferring the legs of the birds from the shackles of the first conveyor line to the transfer means, and transferring the legs of the birds from the transfer means to the shackles of the second conveyor line.

2. The method of claim 1, and wherein a portion of the first and second conveyor lines are arranged parallel to each other and the shackles of each conveyor line are moved in a direction generally opposite to the direction of movement of the shackles of the other conveyor line.

3. The method of claim 1, and wherein the step of moving the transfer means closer together and further apart comprise moving each transfer means on equal angular radians while reciprocating each transfer means radially toward and away from the axis of rotation as the transfer means revolve.

4. A method of transferring birds from a first conveyor line on which the birds are suspended by their legs from a series of shackles spaced at a first predetermined distance to a second suspended conveyor line having a series of shackles spaced at a second predetermined distance that is different than the first predetermined distance, comprising the steps of:

revolving a transfer carousel between the first and second conveyor lines about an axis of rotation, the transfer carousel including a series of transfer means each mounted on a travel bar and having a cam follower mounted thereto, for supporting and moving the birds, as the transfer carousel is revolved, the transfer means along an eccentric path adjacent the first and second conveyor lines toward registration with the shackles of the conveyor lines, as the transfer means of the transfer carousel revolve, reciprocating each transfer means toward and away from the axis of rotation by moving the cam follower along a stationary cam surface adjacent the travel bar so as to move the transfer means closer together to register with the shackles that are close together on one conveyor line and to move the transfer means further apart to register with the shackles that are further apart on the other conveyor line, and as the transfer means register with the shackles, transferring the legs of the birds from the shackles of the first conveyor line to the transfer means, and transferring the legs of the birds from the transfer means to the shackles of the second conveyor line.

5. The method of claim 1, and wherein the step of revolving the transfer means comprises moving the recesses of each transfer plate into registration with the shackles of the second conveyor line.

6. A method of transferring birds from a first conveyor line on which the birds are suspended by their legs from a series of shackles substantially equally spaced at a first predetermined distance to a second suspended conveyor line having a series of shackles substantially equally spaced at a second predetermined distance that is different than the first predetermined distance, comprising the steps of:

revolving a series of transfer means between the first and second conveyor lines, as the transfer means revolve, moving the transfer means closer together to register with the shackles that are close together on one conveyor line and moving the transfer means further apart to register with the shackles that are further apart on the other conveyor line, and as the transfer means register with the shackles, transferring the legs of the birds from the shackles of the first conveyor line to the transfer means, and moving the transfer means past a cam surface that is angled across the path of movement of the transfer means so that the legs of the birds engage the cam surface and are transferred to the shackles of the second conveyor line.

7. An apparatus for transferring birds moving in series suspended from the shackles of a first suspended conveyor line to the shackles of a second suspended conveyor line, with the shackles of the first conveyor line being spaced apart a distance that is different than the spacing of the shackles of the second conveyor line, comprising:

- a support module positioned between the first and second conveyor lines and rotatable about a vertical axis,
- a plurality of transfer means carried by said support module for supporting the legs of the birds and carrying the birds from the first conveyor line to the other conveyor line,
- means for moving said transfer means carried by said support module into registration with the shackles of the first and second conveyor lines,
- means for reciprocating said transfer means toward and away from said vertical axis, including a plurality of travel bars extending laterally through said support module at equally spaced radians from said vertical axis for supporting said transfer means,
- drive means for rotating said support module in timed relationship with the first and second conveyor lines, and means for moving said transfer means along an eccentric path about said vertical axis while reciprocating said transfer means toward and away from said vertical axis for moving said transfer means closer together and further apart as said transfer means register with the shackles of each conveyor line to substantially match the spacing of the shackles on the conveyor line.

8. The apparatus of claim 7, and further comprising means for moving the birds from the transfer means to the shackles of the second conveyor line as the transfer means register with the shackles of the first and second conveyor line.

9. The apparatus of claim 7, and wherein said means for moving each transfer means along an eccentric path about said vertical axis while reciprocating said transfer means comprises

- a stationary cam positioned adjacent the support module, and
- cam follower means mounted to each guide bar means for engaging said stationary cam,
- whereby in response to the rotation of said support module said cam follower means engage said stationary cam and reciprocate said transfer means toward and away from said vertical axis and alternately move said transfer means closer to and further away from a next adjacent transfer means to match the spacing of the shackles on the conveyor lines.

10. The apparatus of claim 7, and wherein the transfer means are carried by the support module in a substantially common plane.

11. The apparatus of claim 10, and wherein the travel bars are substantially horizontally oriented and vertically spaced from each other.

12. Apparatus for transferring birds from a first conveyor line on which the birds are moved suspended by their legs from a series of spaced shackles to a second conveyor line having a series of shackles moving therealong spaced at differing intervals from the intervals between the shackles of the first conveyor, comprising:

- a support module positioned between the first and second conveyor lines and adapted to rotate about a vertical axis;
- transfer assemblies movably mounted to said support module and rotatable therewith, each of said transfer assemblies including travel bars slidably disposed through said support module and having bird transfer plates mounted at ends thereof for receiving and moving the birds between the first conveyor line and the second conveyor line;
- a cam track positioned adjacent said support module; and
- a cam follower mounted to each of said transfer assemblies and adapted to engage and move along said cam track for moving said bird transfer plates toward and away from said vertical axis and at the same time for varying the spacing between said bird transfer plates as said bird transfer plates are moved adjacent the shackles of the conveyor lines to substantially match the spaced intervals between the shackles of the first and second conveyor lines.

13. The apparatus of claim 12 and further including a cam surface mounted along the path of movement of said bird transfer plates so that the legs of the birds held by said bird transfer plates engage said cam surface and are urged from said bird transfer plates onto the shackles of the second conveyor line.

14. The apparatus of claim 12 and wherein said bird transfer plates each include leg receiving recesses formed therein for receiving and supporting the legs of a bird.

* * * * *